United States Patent Office 3,243,415
Patented Mar. 29, 1966

3,243,415
POLYMERIC COMPOSITION OF VINYLIDENE CYANIDE ON UNSATURATED SULFONIC ACID AND A NON-IONIC NONETHYLENICALLY UNSATURATED MONOMER
Myron Q. Webb, Wilmington, Del., assignor to E. I. du Pont de Nemours and Company, Wilmington, Del., a corporation of Delaware
No Drawing. Filed Oct. 6, 1961, Ser. No. 143,302
7 Claims. (Cl. 260—78.5)

This invention relates to copolymers of vinylidene cyanide and particularly to copolymers of vinylidene cyanide having improved dyeability.

This application is a continuation-in-part of copending U.S. application Serial No. 723,129, filed March 24, 1958, now abandoned.

It is known that vinylidene cyanide has a strong tendency to homopolymerize by an ionic mechanism. This prevents the preparation of copolymers includinig this monomer in aqueous solution in other polar solvents, or in the presence of any material which ionizes. If the comonomer to be used with vinylidene cyanide is not ionized and is soluble in vinylidene cyanide monomer or in a solvent for that monomer which does not initiate vinylidene cyanide homopolymerization, the two may be copolymerized using non-ionic polymerization initiators.

The copolymers that may be made according to the prior art have all been deficient in dyeability, particularly when in the form of shaped articles. The chief reason for this is that most of the dyeing processes of importance in the acrylic fiber field require the presence in the polymer of a dye site which is ionic in nature. Such dye sites are normally incorporated into the fiber-forming polymer by the addition of an acid or basic comonomer during the polymerization operation.

Such a process cannot be used in the case of the vinylidene cyanide copolymers because the ionic monomer would initiate homopolymerization of the vinylidene cyanide, thereby producing a non-dyeable homopolymer which would not include either the ionic monomer itself or any other comonomer desired to be included in the polymer.

It is, therefore, an object of this invention to prepare new copolymers of vinylidene cyanide. It is a further object to prepare copolymers having improved dyeability. It is a still further object to prepare copolymers having enhanced basic dyeability when converted into filaments, films, and shaped articles.

These and other objects are achieved by providing a copolymer having improved dyeability containing vinylidene cyanide and from about 0.1% to about 20% of a hydrolyzable neutral ester of an unsaturated copolymerizable sulfonic acid. Copolymers containing vinylidene cyanide, from about 0.1% to about 20% of a hydrolyzable neutral ester of an unsaturated polymerizable sulfonic acid, and up to about 60% of a neutral copolymerizable ethylenically unsaturated monomer are also included.

In the process of this invention a polymerizable monomeric mixture is prepared in a non-ionic or neutral diluent. A non-ionic or free radical initiator is added to the mixture. Care must be taken to provide moisture-free reactants as well as a moisture-free environment during polymerization since the presence of a few drops of water is sufficient to initiate homopolymerization of the vinylidene cyanide.

By the terms "neutral ester," "neutral diluent" and "neutral ethylenically unsaturated monomer" it is meant non-acidic and non-basic compounds, i.e., having no free electric charge and, therefore. having neither acid nor basic reactions.

The copolymers of the present invention containing sulfonic acid or sulfonate salt groups show greatly enhanced dyeability with the class of dyes known as basic or cationic dyes. Surprisingly, many of these copolymers can be prepared, converted into shaped articles, and dyed without preliminary treatments. This is possible because of the presence in the polymer chain of the readily hydrolyzable ester of the sulfonic acid.

Alternatively, the polymer itself may be hydrolyzed to yield the free sulfonic acid or its salt, and the polymer so obtained may then be shaped, for example, into fibers, filaments or film, by a known wet- or dry-spinning process. Hydrolysis is readily accomplished under mild conditions in an inorganic or organic medium.

As previously indicated, monomeric vinylidene cyanide when placed in an ionic solution tends to homopolymerize, giving a solid, water-insoluble resin. Therefore, polymerization must be carried out using a non-ionic system.

The following examples are meant to be illustrative of the invention and are not intended to limit it to the particular processes or copolymers described therein. Any of the neutral esters of unsaturated polymerizable sulfonic acids and neutral copolymerizable ethylenically unsaturated monomers described herein may be substituted in like amounts for the corresponding compounds given in the examples. Unless otherwise indicated, parts and percentages are given by weight.

EXAMPLE I

Methyl styrenesulfonate is prepared as follows. In a stirred vessel, 468 grams of chlorosulfonic acid are cooled to 15° C. in an ice-salt bath. Two hundred and seventy (270) grams of beta-bromoethylbenzene is added slowly while maintaining the temperature of the mixture below 20° C. After addition is complete, the reaction mixture is stirred for an additional thirty minutes at 15° C. to 20° C. The viscous, dark brown oil formed is poured onto crushed ice and the resulting solid is filtered off and washed with ice water.

This crude product is dissolved in a mixture of 700 ml. of ether and 50 ml. of methanol. The solution is cooled to 10° C. to 20° C., and a solution of 150 grams of potassium hydroxide in 175 ml. of water is slowly added with the temperature being maintained in this range. After stirring for an additional hour at 25° C., the mixture is filtered and the filtrate is neutralized with a small amount of 5 N sulfuric acid and then poured into 2 liters of water. The ether layer is separated from the aqueous layer and is dried over anhydrous sodium sulfate. After removing the ether under vacuum at room temperature, 0.1% by weight of hydroquinone is added to the crude product which is used in polymerizations with no further purification. This material contains 80% methyl styrenesulfonate according to vinyl activity analysis by a bromidebromate titration.

EXAMPLE II

Vinylidene cyanide is prepared as follows. In a stirred vessel are placed 310 grams of malononitrile and 2 liters of ethanol. After cooling to 0° C., 190 grams of 37% formaldehyde solution is added. Fifty (50) drops of piperidine is added over a period of one hour, the reaction mixture being maintained at 0° C. with stirring. After cooling to −20° C. for sixteen hours, the crystals which form are filtered and washed in sequence with 1 liter of 5% sulfuric acid, 1 liter of distilled water, and 50 ml. of ethanol precooled to 0° C. After drying at room temperature, the crystalline product is further dried in a vacuum desiccator over $P_2O_5$ and paraffin. The yield is 104 grams of 1,1,3,3-tetracyanopropane, melting at 134° C. By additional cooling, the mother liquor gives two additional crops of crystalline product, making a total yield of 281 grams or 85%.

This intermediate is pyrolyzed under vacuum to form vinylidene cyanide and malononitrile. This is done in small batches using a flask fitted with a coarse capillary tube for admitting dry $SO_2$ and connected through a short side arm to an evacuated receiver immersed in a cooling bath of Dry Ice and a 50/50 mixture of carbon tetrachloride and chloroform. A small amount of $P_2O_5$ is placed in the receiver at the start of the run. One hundred (100 grams) or 1,1,3,3-tetracyanopropane is placed in the pyrolysis flask, and it is evacuated to 5 mm. mercury pressure and then immersed in an oil bath heated to 200° C. The pyrolysis products are collected in the receiver as a white solid over a period of one hour. The products are then separated by vacuum distillation, using $SO_2$ as stabilizer. A 50% yield of vinylidene cyanide boiling at 44° C. under 5 mm. pressure is obtained.

EXAMPLE III

A series of copolymers of vinylidene cyanide, vinyl acetate, and methyl styrenesulfonate is prepared using a batch procedure. Each polymerization is carried out by stirring a mixture of the monomers, dry benzene diluent, and alpha,alpha'-azobis(alpha,gamma - dimethylvaleronitrile) initiator under nitrogen at 45° C. for several hours. The mixture is then poured into n-hexane with stirring. The precipitated polymer is filtered, washed with n-hexane, and dried at room temperature. The results are set forth in the following table:

*Table 1*

| Ex. III | Feed Ratio, $VCN_2$/VAc/MSS [a] | Percent Monomer [b] | Percent Initiator | Percent Conv. | $[n]$ [c] | Time, Hours |
|---|---|---|---|---|---|---|
| A | 47.5/52.5/0 | 60 | 0.25 | 75 | 1.59 | 3 |
| B | 44.5/55.5/0 | 62 | 0.2 | 71 | 1.88 | 3 |
| C | 44/55/1 | 62 | 0.2 | 66 | 1.86 | 3 |
| D | 47/52/1 | 60 | 0.25 | 65 | 1.41 | 3 |
| E | 47/52/1 | 60 | 0.5 | 62 | 0.86 | 3 |
| F | 47/52/1 | 50 | 0.5 | 55 | 1.05 | 5 |
| G | 47/51/2 | 50 | 0.5 | 52 | 1.31 | 5 |
| H | 48/48/4 | 50 | 0.5 | 32 | 0.74 | 3 |
| I | 45/45/10 | 50 | 0.5 | 44 | 0.96 | 3 |
| J | 40/40/20 | 50 | 0.5 | 62 | 1.24 | 2.5 |
| K | 100/0/0 | 50 | 0.25 | 5 | 0.2 | 3 |
| L | 98/0/2 | 50 | 0.25 | 7 | 0.3 | 3 |
| M [d] | 47/51/2 | 50 | 0.5 | 55 | 1.3 | 5 |
| N [e] | 47/51/2 | 50 | 0.5 | 60 | 1.25 | 5 |

[a] $VCN_2$=vinylidene cyanide; VAc=vinyl acetate; MSS=methyl styrenesulfonate.
[b] Benzene used as diluent.
[c] $[n]$=intrinsic viscosity.
[d] Ethyl styrenesulfonate used in place of MSS.
[e] Butyl styrenesulfonate used in place of MSS.

EXAMPLE IV

Samples of polymers B and C from Example III are separately dyed for one hour each at the boil with an aqueous solution containing an excess of the basic dye known as Brilliant Green Crystals (Color Index 662). Each polymer sample is filtered off, washed with water, and dissolved in butyrolactone to form a 0.05% solution. The percent dye in each solution is then determined spectrophotometrically. Sample C which is made with 1% methyl styrenesulfonate in the monomer mixture is found to have picked up three times the amount of dye as picked up by sample B which contains vinylidene cyanide and vinyl acetate in the same ratio as sample C but does not contain any methyl styrenesulfonate.

Samples of these same two undyed polymers are dissolved in hot dimethylformamide and films are cast from the solutions using an evaporative technique. The films are drawn to four times their original length, are boiled in water to remove solvent and allow relaxation, and are dried.

These films are dyed at the boil with an excess of basic dye (Color Index 662). By dissolving in butyrolactone and analyzing the resulting solution, it is found that the film containing no methyl styrenesulfonate contains 0.066% dye based on the weight of the film, and the film containing methyl styrenesulfonate has 0.091% dye on the same basis. Thus, even in oriented film form, dyeability with basic dyes is significantly improved by the use of methyl styrenesulfonate as comonomer in polymer preparation. Similar results are obtained when the polymers are converted to drawn fibers.

Samples of polymers K and L from Example III are likewise separately dyed with Brilliant Green Crystals (Color Index 662). As in the case of the polymers containing vinyl acetate, the presence of methyl styrenesulfonate brings about a definite improvement in dyeability. Thus, the copolymer from sample L which was made with 2% methyl styrenesulfonate in the feed dyes more deeply than the homopolymeric vinylidene cyanide of sample K.

EXAMPLE V

Samples of polymers H and I of Example III are treated in a 0.1 N sulfuric acid bath at a temperature of 50° C. for a period of one hour. The polymer samples are removed from the bath, washed thoroughly with deionized water, and dried. A solution of each of the hydrolyzed polymer samples is prepared in N,N-dimethylformamide. The solutions are passed through a mixed bed deionization column and thereafter a titration is made, using alcoholic potassium hydroxide. Titration of solutions of the polymers reveals that the combined methyl styrenesulfonate is hydrolyzed, yielding combined styrenesulfonic acid.

Polymer H is found to have an acidity of 384 milliequivalents per kilogram of polymer and polymer I an acidity of 511 milliequivalents per kilogram of polymer. The sodium salt of each of the sulfonic acid-containing polymers is prepared by separately slurrying the polymers in a dilute solution of sodium bicarbonate.

EXAMPLE VI

Samples of polymers F and G of Example III are treated in an aqueous bath containing 20.4 grams per liter of potassium acid phthalate (used as a buffer) and sufficient 0.1 N hydrochloric acid to provide a pH of 3. The combined acidity (sulfonic acid derived from hydrolysis of the combined methyl styrenesulfonate) is determined by titration of solutions of the respective polymers in deionized N,N-dimethylformamide by passing solutions of the polymers through a mixed bed deionization column and carrying out the titration, using alcoholic potassium hydroxide. The hydrolysis conditions and the combined acidity are set forth in the following table:

*Table 2*

| Polymer | pH | Hydrolysis Conditions | | Combined Acidity, meq./kg. |
|---|---|---|---|---|
| | | Temp., °C. | Time, hrs. | |
| F | 3 | 27 | 1 | 89 |
| G | 3 | 27 | 1 | 147 |

The potassium salt of each of the acid-containing polymers is prepared by separately slurrying samples of each of the polymers in a dilute solution of potassium carbonate.

As illustrated in the examples, the polymers containing the combined hydrolyzable esters of the sulfonic acids may be readily hydrolyzed to provide polymers containing combined sulfonic acid. Since the alkali metal salts of these polymers have been found to be more stable than the acid-containing polymers, conversion to the salt form is preferred. This is readily accomplished by slurrying the polymer in a dilute aqueous solution of lithium, potassium, or sodium carbonate or bicarbonate to yield the corresponding salt form.

The amount of sulfonic acid ester in monomeric form used in the copolymers of this invention may vary from about 0.1% to about 20%, depending on the particular monomer used. Generally, from 0.2% to 10% is preferred.

Other esters of styrenesulfonic acid such as the propyl, amyl, and higher alkyl esters, as well as aryl esters such as phenyl, tolyl, bromophenyl, etc., may be substituted in like amounts for those described in the foregoing examples. However, higher esters are not as readily hydrolyzable as the lower alkyl esters. Although the aryl esters are particularly resistant to hydrolysis and as such are not as useful as the alkyl esters, improved dyeability of the polymer is exhibited. Likewise, esters of other unsaturated sulfonic acids such as ethylenesulfonic acid, 2-propenesulfonic acid, 2-methyl-2-propenesulfonic acid, p-styrylmethanesulfonic acid, and the like may be used, the chief requirements being that the ester contains no group which will initiate anionic homopolymerization of vinylidene cyanide and that it be hydrolyzable to the corresponding sulfonic acid when combined in a polymer.

In addition to the non-ionic free radical initiator set forth in the examples, other similar compounds may be used. In general, diazo compounds having the formula

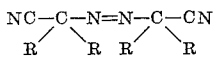

where each R is a hydrocarbon radical, such as alpha, alpha'-azodiisobutylronitrile, alpha,alpha'-azobis-(alpha, beta - dimethylbutyronitrile), alpha, alpha'-azobis(alpha-cyclopropionitrile), and the like, as well as other initiators which do not initiate ionic polymerization of the vinylidene cyanide, may be used. In addition, peroxides such as benzoyl peroxide, cumene hydroperoxide, t-butyl peroxide, o-chlorobenzoyl peroxide, and the like may be used. The amount of initiator is not critical and will vary, depending on the molecular weight of the product and the specific initiator used. The optimum amount can be readily determined by one skilled in the art.

Likewise, diluents other than benzene may be used, e.g., xylene, toluene, heptane, or other non-polar solvents. The diluent must be one in which the monomers to be polymerized are soluble and should also be non-polar in order to prevent homopolymerization of the vinylidene cyanide. Preferably, the diluent should be selected from those which are non-solvents for the polymer; however, this is not a limiting feature.

Likewise, the other monomer present in the polymer need not be vinyl acetate. The product may be a simple copolymer of vinylidene cyanide and an ester of a polymerizable sulfonic acid. Alternatively, it may be a copolymer containing up to about 60% of any of the monomers copolymerizable with vinylidene cyanide described in U.S. Patents Nos. 2,615,865 through 2,615,880 and U.S. Patent No. 2,716,106, e.g., monoolefinic hydrocarbons, halogenated monoolefinic hydrocarbons, monoolefinic unsaturated esters such as vinyl acetate, vinyl alpha-chloroacetate, allyl esters, esters from alkenyl alcohols, monoolefinically unsaturated organic nitriles such as acrylonitrile and the like, and esters of monoolefinically unsaturated carboxylic acids, to mention a few.

The polymers of this invention are particularly desirable for use in the manufacture of textile products in fiber or filamentary form. Due to the presence of the sulfonate ester groups, or their hydrolyzed products containing sulfonic acid or sulfonate salt groups, the fibers readily accept dyes and can therefore be dyed to vivid colors. The polymers of this invention are also useful for the preparation of films, sheets and molded articles. In these forms, the enhanced dyeability of the product is particularly desirable. The polymeric products described herein may also be advantageously used in granular form as soil conditioning agents.

The most striking advantage of the products of this invention is their enhanced dyeability. In addition, this very desirable feature is achieved generally without loss of tensile strength or other desirable physical properties of known vinylidene cyanide copolymers. A particular advantage lies in the fact that many of the polymers of this invention can be prepared, converted into shaped articles, and dyed without the necessity of preliminary treatments. In addition, the polymers of this invention have improved hydrophilic properties. The hydrophilic swelling of fibers prepared from these polymers leads to the development of desirable aesthetic properties such as improved hand and appearance of the ultimate fabrics.

It will be apparent that many widely different embodiments of this invention may be made without departing from the spirit and scope thereof, and therefore it is not intended to be limited except as indicated in the appended claims.

I claim:
1. A composition of matter comprising a fiber-forming copolymer prepared from a mixture including a free radical catalyst and at least 20% vinylidene cyanide and from about 0.1% to about 20% by weight of a combined hydrolyzable alkyl ester of a sulfonic acid selected from the group consisting of styrenesulfonic acid, ethylenesulfonic acid, 2-propenesulfonic acid, 2-methyl-2-propenesulfonic acid, and p-styrylmethanesulfonic acid and having from one to five carbon atoms in the alkyl chain of the ester, and up to about 60% by weight of a combined copolymerizable non-ionic monoethylenically unsaturated monomer, the total amounts of cyanide, ester and monomer being 100%.

2. The product of claim 1 in the form of a filament.

3. A composition of matter comprising a fiber-forming copolymer prepared from a mixture including a free radical catalyst and at least 20% vinylidene cyanide and from about 0.1% to about 20% by weight of a combined methyl styrenesulfonate and up to about 60% by weight of combined vinyl acetate, the total amount of cyanide, styrenesulfonate and acetate being 100%.

4. A composition of matter prepared by hydrolysis of a copolymer of claim 1 and comprising a fiber-forming copolymer of at least 20% vinylidene cyanide and from about 0.1% to about 20% by weight of a combined sulfonic acid selected from the group consisting of styrenesulfonic acid, ethylenesulfonic acid, 2-propenesulfonic acid, 2-methyl-2-propenesulfonic acid, and p-styrylmethanesulfonic acid, and up to about 60% by weight of a combined copolymerizable non-ionic monoethylenically unsaturated monomer, the total amount of cyanide, sulfonic acid and monomer being 100%.

5. The product of claim 4 in the form of a filament.

6. The composition of claim 4 wherein said sulfonic acid is neutralized and is present in the form of an alkali metal salt.

7. The product of claim 6 in the form of a filament.

References Cited by the Examiner

UNITED STATES PATENTS

| | | | |
|---|---|---|---|
| 2,716,106 | 8/1955 | Gilbert et al. | 260—78.5 |
| 2,837,500 | 6/1958 | Andres et al. | 260—78.5 |
| 2,837,501 | 6/1958 | Millhiser | 260—78.5 |

JOSEPH L. SCHOFER, *Primary Examiner.*

JAMES SEIDLECK, *Examiner.*